Patented July 5, 1938

2,122,409

UNITED STATES PATENT OFFICE 2,122,409

ESTERS OF PARA-HYDROXYPHENYLIMINO-DIACETIC ACID

Hans T. Clarke, New York, and Frederic R. Bean, Rochester, N. Y., assignors to Eastman Kodak Company, Rochester, N. Y., a corporation of New Jersey No Drawing. Original application June 26, 1936, Serial No. 87,469. Divided and this application October 27, 1936, Serial No. 107,836

4 Claims. (Cl. 260—104)

This invention relates to esters of p-hydroxyphenyliminodiacetic acid, and to a process of preparing them.

This application is a division of our application Serial No. 87,469, filed June 26, 1936.

p-Hydroxyphenyliminodiacetic acid has the structural formula

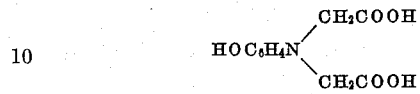

and is described by L. Galatis in Helvetica Chimica Acta 4, 574–9, (1921). Its preparation is also described in German Patent 383,190, abstracted in Chemisches Zentralblatt, vol. 24, part I, page 1592. A sodium salt of this compound can be prepared by treating with sufficient sodium hydroxide solution to neutralize the carboxyl groups, and evaporating to dryness. The dibutyl ester can be prepared from the sodium salt in the following manner:

A suspension of 500 grams of the sodium salt of p-hydroxyphenyliminodiacetic acid in 1200 cc. of butyl alcohol containing an excess of dry hydrogen chloride (2–3 molar equivalents) is heated under reflux for 15–16 hours. The sodium chloride formed is filtered off, and most of the butyl alcohol, together with the water formed in the esterification, is distilled off at atmospheric pressure. The residue is treated with a concentrated solution of sodium carbonate and distilled under reduced pressure. The product boils at 195–210° C. under 2–3 mm. pressure. It is a straw colored liquid which easily solidifies. The solid melts at 64–65° C., is insoluble in water, soluble in dilute aqueous alkalies and mineral acids, and soluble in practically all organic liquids.

The dibutyl ester of p-hydroxyphenyliminodiacetic acid is an excellent antioxidant for preventing gum formation in gasoline, as is described and claimed in our parent application above referred to.

While we have described the dibutyl ester of p-hydroxyphenyliminodiacetic acid and its preparation, other lower dialkyl esters of p-hydroxyphenyliminodiacetic acid, such, for instance, as the diethyl and dipropyl esters, may be prepared by the same method, substituting the corresponding alcohol for butyl alcohol.

What we claim as our invention and desire to be secured by Letters Patent of the United States is:

1. A lower dialkyl ester of p-hydroxyphenyliminodiacetic acid.

2. A dibutyl ester of p-hydroxyphenyliminodiacetic acid.

3. A process of preparing a lower dialkyl ester of p-hydroxyphenyliminodiacetic acid, which comprises refluxing a suspension of the sodium salt of p-hydroxyphenyliminodiacetic acid in a lower aliphatic alcohol containing an excess of dry hydrogen chloride, and separating the ester from the sodium chloride formed.

4. A process of preparing a dibutyl ester of p-hydroxyphenyliminodiacetic acid, which comprises refluxing a suspension of the sodium salt of p-hydroxyphenyliminodiacetic acid in butyl alcohol containing an excess of dry hydrogen chloride, and separating the ester from the sodium chloride formed.

HANS T. CLARKE.
FREDERIC R. BEAN.